(No Model.)
T. FAILER.
FURNACE FILLING BARROW.
No. 399,393. Patented Mar. 12, 1889.
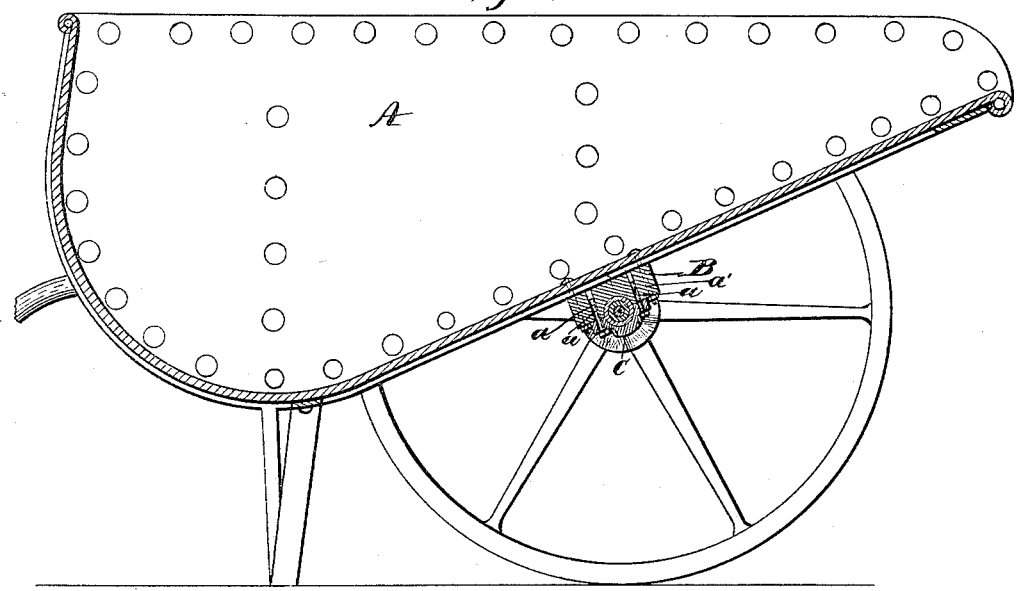
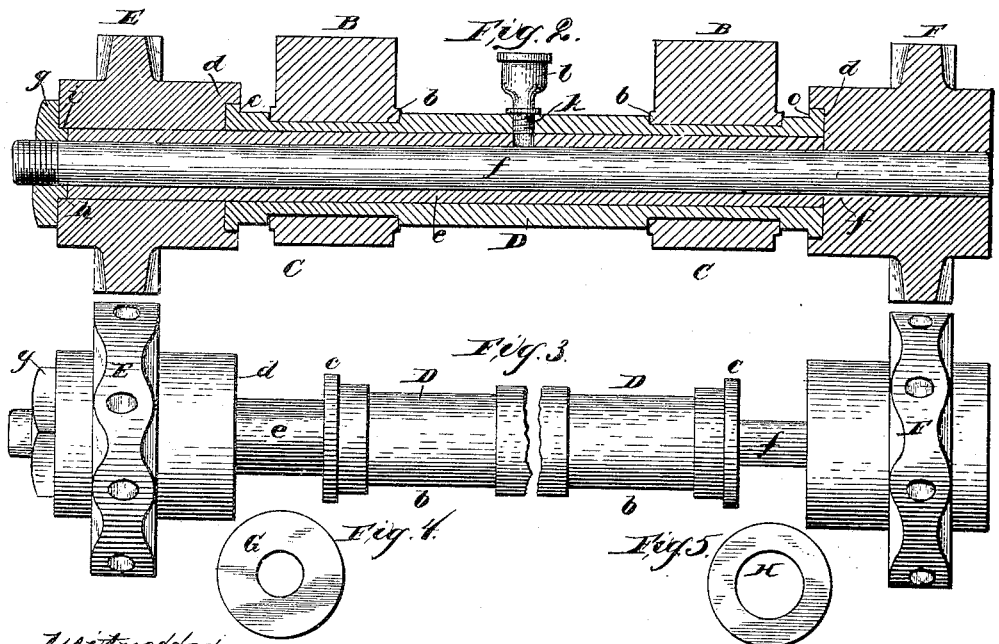
Witnesses:
Wm. H. Scott
M. A. Reinohl
Inventor:
Thomas Failer
By Johnston, Reinohl & Dye
his Attorneys

UNITED STATES PATENT OFFICE.

THOMAS FAILER, OF LEBANON, PENNSYLVANIA.

FURNACE-FILLING BARROW.

SPECIFICATION forming part of Letters Patent No. 399,393, dated March 12, 1889.

Application filed July 7, 1888. Serial No. 279,333. (No model.)

*To all whom it may concern:*

Be it known that I, THOMAS FAILER, a citizen of the United States, residing at Lebanon, in the county of Lebanon and State of Pennsylvania, have invented certain new and useful Improvements in Furnace-Filling Barrows; and I do hereby declare the following to be a full, clear, and exact description of the invention, such as will enable others skilled in the art to which it appertains to make and use the same.

My invention relates to furnace-filling barrows, and has for its object the construction of an improved axle for use in connection therewith.

The invention will be hereinafter described, and particularly pointed out in the claims.

In the accompanying drawings, which form a part of this specification, Figure 1 represents a vertical longitudinal section through a furnace-filling barrow and one of its axle-boxes. Fig. 2 is a similar view of the axle detached. Fig. 3 is a detail in side elevation, and Figs. 4 and 5 are plans of detached washers.

Reference being had to the drawings and the letters marked thereon, A represents the body of the barrow; B, the axle-boxes, which are provided with detachable covers C, and are secured to the body A by bolts $a$, which pass through the axle-box, as shown in Fig. 1. The covers C are secured to the box by bolts $a'$.

D represents a sleeve, which extends the entire width of the barrow, and is provided with recesses $b$, with which the axle-boxes and their covers engage, and collars $c$ on the ends of the sleeve, which enter rabbets $d$ in the hubs E F of the wheels of the barrow. The hub E is provided with a tubular axle, $e$, which passes nearly through the hub and is forced in under hydraulic pressure, while the axle extends across the barrow to the end of the sleeve D. The hub E is provided with a solid steel axle, $f$, also secured therein under hydraulic pressure and extends through the hub E of the opposite wheel, and the wheel is secured thereto by a nut, $g$, which is provided with a projection, $h$, which enters and fills a recess, $i$, in the outer end of the hub. The axle is lubricated by drilling a hole, $k$, through the sleeve D and the axle $e$, and attaching an ordinary oil-cup, $l$, to the sleeve.

By the construction described all dust is excluded from the bearing-surface of the axle, and the wear of the axle distributed throughout the entire width of the barrow.

G and H are washers, the former to be placed on the solid axle $f$ as the collar $c$ and the recess $d$ in the hub E become worn, and the latter to be placed on the tubular axle $e$ when the collar on the opposite end of the sleeve and the recess in the hub F become worn.

When it becomes necessary to remove the axle for repairs, the covers C of the axle-boxes B are detached and the entire axle released, when it can be separated by removing the nut $g$ on the free end of the solid axle $f$.

Having thus fully described my invention, what I claim is—

1. A furnace-barrow axle consisting of an inner solid axle secured to one hub and a tubular axle secured to the opposite hub, in combination with a surrounding sleeve having axle-boxes secured thereto, substantially as described.

2. A furnace-barrow axle consisting of an inner solid axle secured to one hub, a tubular axle secured to the opposite hub, and a surrounding sleeve, all of which extend across the barrow, in combination with axle-boxes secured to the barrow and provided with detachable covers, substantially as described.

3. A furnace-barrow axle consisting of an inner solid axle secured to one hub, a tubular axle secured to the opposite hub, and a surrounding sleeve having collars on each end, in combination with hubs having recesses in their inner ends, substantially as described.

4. A furnace-barrow axle consisting of an inner and an outer axle secured, respectively, to opposite hubs, and a sleeve, all of which have bearings in the hubs of the wheels of the barrow, in combination with axle-boxes for securing the axle to the barrow, substantially as described.

In testimony whereof I affix my signature in presence of two witnesses.

THOMAS FAILER.

Witnesses:
TOBIAS REINOEHL,
T. T. WORTH.